(12) United States Patent
Hashida et al.

(10) Patent No.: US 8,989,333 B2
(45) Date of Patent: Mar. 24, 2015

(54) CLOCK DATA RECOVERY METHOD AND CLOCK DATA RECOVERY CIRCUIT

(71) Applicant: Fujitsu Limited, Kawasaki-shi, Kanagawa (JP)

(72) Inventors: Takushi Hashida, Kawasaki (JP); Hirotaka Tamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/033,128

(22) Filed: Sep. 20, 2013

(65) Prior Publication Data

US 2014/0169442 A1    Jun. 19, 2014

(30) Foreign Application Priority Data

Dec. 19, 2012  (JP) ................... 2012-277166

(51) Int. Cl.
| | |
|---|---|
| *H04L 7/033* | (2006.01) |
| *H03L 7/08* | (2006.01) |
| *H04L 7/00* | (2006.01) |

(52) U.S. Cl.
CPC ..................... *H04L 7/0025* (2013.01)
USPC ......................... 375/376; 327/156

(58) Field of Classification Search
CPC ..... H04L 7/0058; H04L 7/0062; H04L 7/033; H04L 7/0331; H04L 7/0334; H04L 27/148; H04L 27/152; H04L 27/2272; H03L 7/06; H03L 7/07; H03L 7/08; H03L 7/0807; H03L 7/091; H03L 7/093; H03L 2207/06; H03L 2207/10; H03L 2207/12; H03L 2207/14; H03L 2207/50

USPC ......... 375/233, 232, 326, 327, 346, 350, 371, 375/373; 327/146, 147, 155, 156; 708/313, 708/322, 323

See application file for complete search history.

(56) References Cited

U.S. PATENT DOCUMENTS

| | | | |
|---|---|---|---|
| 2008/0056403 A1* | 3/2008 | Wilson .......................... | 375/268 |
| 2010/0061498 A1* | 3/2010 | Doi et al. ...................... | 375/371 |
| 2012/0140811 A1* | 6/2012 | Shibasaki ..................... | 375/229 |

FOREIGN PATENT DOCUMENTS

JP  2007-174023 A  7/2007

OTHER PUBLICATIONS

Mueller, et al., "Timing Recovery in Digital Synchronous Data Receivers," IEEE Transactions on Communications, May 1976, pp. 516-531, vol. COM-24, No. 5.

(Continued)

*Primary Examiner* — Young T. Tse
(74) *Attorney, Agent, or Firm* — Arent Fox LLP (57) ABSTRACT

A clock data recovery method includes: integrating an input data signal over a number of cycles of a sample clock to generate an integrated signal; performing a digital process on the integrated signal to output a first digital signal; interpolating the first digital signal in accordance with phase information to generate interpolation data; outputting phase difference data indicating a difference in phase of the interpolation data from the sample clock; performing a filtering process on the phase difference data to generate the phase information; performing an equalization process on the interpolation data in accordance with output data; and performing a binary decision on results of the equalization process to generate the output data.

11 Claims, 13 Drawing Sheets

(56) References Cited

OTHER PUBLICATIONS

Spagna, et al., "A 78mW 11.86b/s Serial Link Transceiver with Adaptive RX Equalization and Baud-Rate CDR in 32nm CMOS," IEEE International Solid-State Circuits Conference (ISSCC), Digest of Technical Papers, Feb. 2010, pp. 366-367.

Tyshchenko, et al., "A 5-Gb/s ADC-Based Feed-Forward CDR in 65 nm CMOS," IEEE Journal of Solid-State Circuits, Jun. 2010, pp. 1091-1098, vol. 45, No. 6.

Tyshchenko, et al., "A Fractional-Sampling-Rate ADC-Based CDR with Feedforward Architecture in 65 nm CMOS," IEEE International Solid-State Circuits Conference (ISSCC), Digest of Tech. Papers, Feb. 2010, pp. 166-167.

* cited by examiner

CLOCK DATA RECOVERY METHOD AND CLOCK DATA RECOVERY CIRCUIT

CROSS-REFERENCE TO RELATED APPLICATION(S)

This application is based upon and claims the benefit of priority from the prior Japanese Patent Application No. 2012-277166 filed on Dec. 19, 2012, the entire contents of which are incorporated herein by reference.

FIELD

The embodiments discussed herein are related to a clock data recovery (CDR) method and a CDR circuit.

BACKGROUND

In devices for trunk communication and information processing devices such as servers, a high-speed I/O circuit is used to transmit and receive a signal at a high bit rate within an integrated circuit chip used in the devices and between integrated circuit chips (within the device and between the devices).

A related technology is disclosed in Japanese Laid-open Patent Publication No. 2007-174023.

Other related technologies are disclosed in O. Tyshchenko, A. Sheikholeslami, H. Tamura, M. Kibune, H. Yamaguchi, and J. Ogawa, "A 5 Gb/s ADC-Based Feed-Forward CDR in 65 nm CMOS," IEEE Journal of Solid-State Circuits, Vol. 45, No. 6, pp. 1091-1098, June. 2010, O. Tyshchenko, A. Sheikholeslami, H. Tamura, Y. Tomita, H. Yamaguchi, M. Kibune, T. Yamamoto, "A Fractional-Sampling-Rate ADC-Based CDR with Feed-Forward Architecture in 65 nm CMOS," IEEE International Solid-State Circuits Conference (ISSCC), Digest of Tech. Papers, pp. 166-167, February 2010, Mueller, K. & Muller, M. "Timing Recovery in Digital Synchronous Data Receivers", IEEE Transactions on Communications, 1976, 24, 516-531, and Spagna, F.; Chen, L.; Deshpande, M.; Fan, Y.; Gambetta, D.; Gowder, S.; Iyer, S.; Kumar, R.; Kwok, P.; Krishnamurthy, R.; chun Lin, C.; Mohanavelu, R.; Nicholson, R.; Ou, J.; Pasquarella, M.; Prasad, K.; Rustam, H.; Tong, L.; Tran, A.; Wu, J. & Zhang, X. "A 78 mW 11.8 Gb/s serial link transceiver with adaptive RX equalization and baud-rate CDR in 32 nm CMOS", IEEE International Solid-State Circuits Conference (ISSCC), Digest of Technical Papers, 2010, 366-367.

SUMMARY

According to one aspect of the embodiments, a clock data recovery method includes: integrating an input data signal over a number of cycles of a sample clock to generate an integrated signal; performing a digital process on the integrated signal to output a first digital signal; interpolating the first digital signal in accordance with phase information to generate interpolation data; outputting phase difference data indicating a difference in phase of the interpolation data from the sample clock; performing a filtering process on the phase difference data to generate the phase information; performing an equalization process on the interpolation data in accordance with output data; and performing a binary decision on results of the equalization process to generate the output data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As the performance of information processing devices improves, improvements in data rate of signal transmission and reception within and between the devices and in power efficiency are sought after. As the data rate increases, it may become more difficult to design a phase interpolation circuit which is an analog circuit, and to simulate the entire feedback system including a digital circuit provided in a subsequent stage. In order to reduce the operation speed of the phase interpolation circuit, a method that uses baud-rate sampling and a method that uses blind sampling may be applied. The method that uses baud-rate sampling uses a clock frequency that is half that of a 2× method, and therefore is advantageous in terms of power efficiency and operation speed.

A method in which the most probable value is selected from among oversampled values may be applied. According to the method, a high-precision phase interpolation circuit may not be provided, and no feedback from a digital circuit to an analog circuit may be provided.

For a blind-sampling (data interpolation) CDR circuit including an analog/digital converter provided at its front end portion, a high-precision phase interpolation circuit such as a phase-locked loop (PLL) circuit may not be provided.

When a baud-rate sampling method and a blind sampling method are applied to a CDR circuit at the same time, use of a baud-rate sampling method at a low sampling rate may cause a loss of data because the blind sampling method interpolates data.

There may be provided a CDR circuit that performs both baud-rate sampling and blind sampling, implements a feedback loop using a digital circuit, and is capable of high-precision clock data reproduction.

Figure 1:
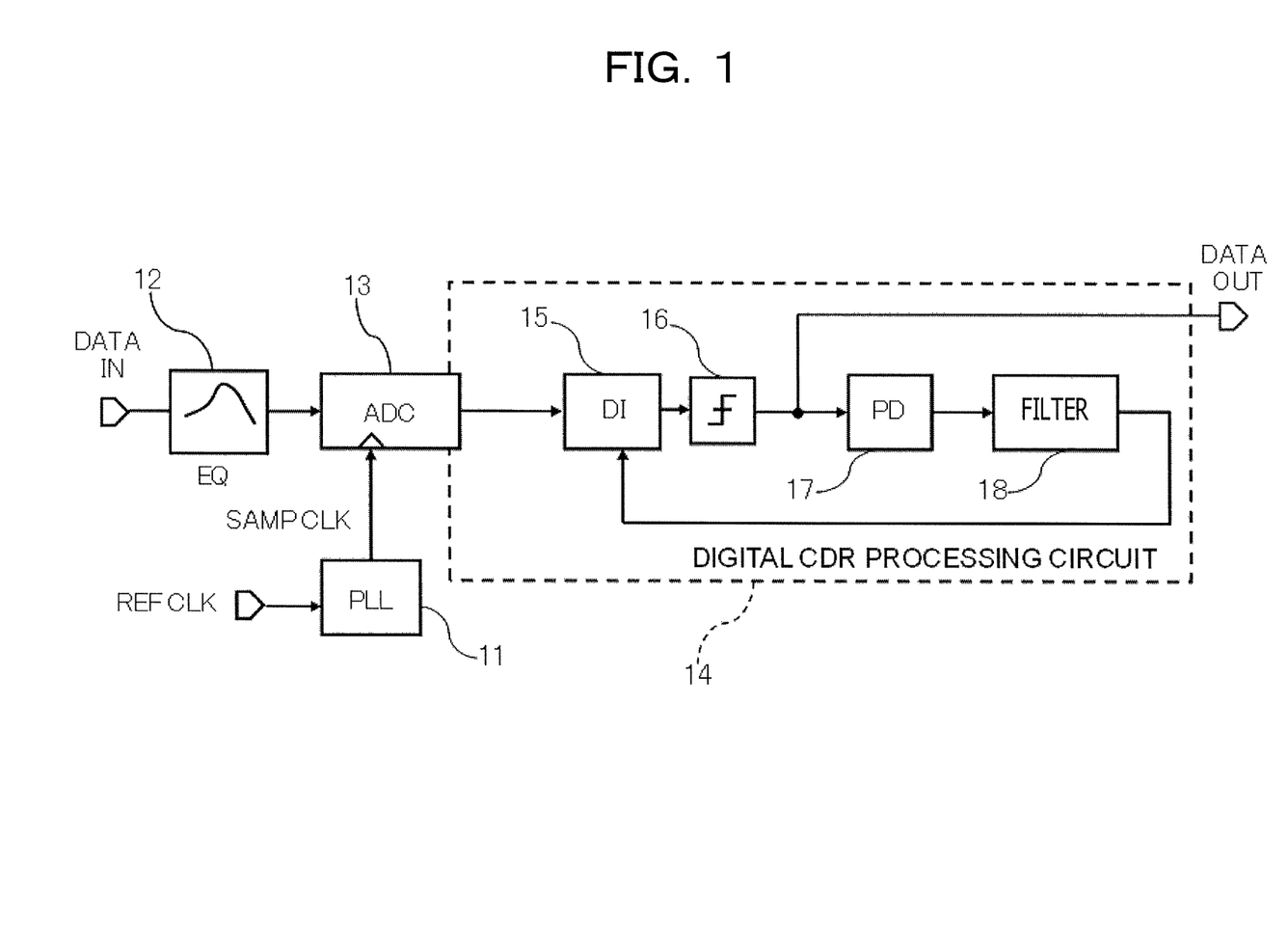
FIG. 1 illustrates an example of a blind-sampling CDR circuit.

FIG. 1 illustrates an example of a blind-sampling CDR circuit. The blind-sampling CDR circuit illustrated in FIG. 1 includes an analog/digital converter (ADC) provided at its front end.

The blind-sampling CDR circuit includes a PLL circuit 11, an equalizer (EQ) 12, an analog/digital converter (ADC) 13, and a digital CDR processing circuit 14. The digital CDR processing circuit 14 includes a data interpolator (DI) 15, a decision circuit 16, a phase detector (PD) 17, and a filter 18.

The PLL circuit 11 multiplies the frequency of a low-speed clock Ref.clk provided from a quartz oscillator to the data rate of an input data signal Data in to generate a sample clock Samp.CLK. The sample clock Samp.CLK and the input data signal Data in may be asynchronous to each other. The EQ 12 performs an analog equalization process for correcting the effect of the symbol value of the input data signal Data in in the preceding cycle. The equalization process may be performed on the transmission side, and a digital equalization process may be performed on the converted digital input data.

The ADC 13 converts the output of the EQ 12 into digital data for a certain number of bits. When the sample clock Samp.CLK and the input data signal Data in are asynchronous to each other, the ADC 13 may not perform an A/D conversion at a timing that is in the middle of unit interval (1 UI) of the input data signal. Therefore, the digital CDR processing circuit 14 may perform a data interpolation process on a plurality of sampled digital values output from the ADC 13 so as to create a value corresponding to the middle of 1 UI, and perform a 1/0 decision on the interpolation data to generate data for one bit.

The DI 15 performs a process for interpolating data output from the ADC 13 using an interpolation coefficient for creating a value corresponding to the middle of 1 UI based on a interpolation method.

The decision circuit 16 performs a 1/0 decision in which the interpolated data output from the DI 15 are compared with a threshold level to generate output data Data out for one bit. The PD 17 detects a phase difference between the input data signal Data in and the sample clock Samp.CLK from the output data Data out. The filter 18 performs a filtering process, e.g. a low-pass filtering process, on data corresponding to the phase difference output from the PD 17 to generate phase information.

The DI 15 decides an interpolation coefficient for creating a value corresponding to the middle of 1 UI based on the phase information output from the filter 18, and performs an interpolation process. The interpolation method used by the DI 15 may be a linear interpolation method.

Figure 2:
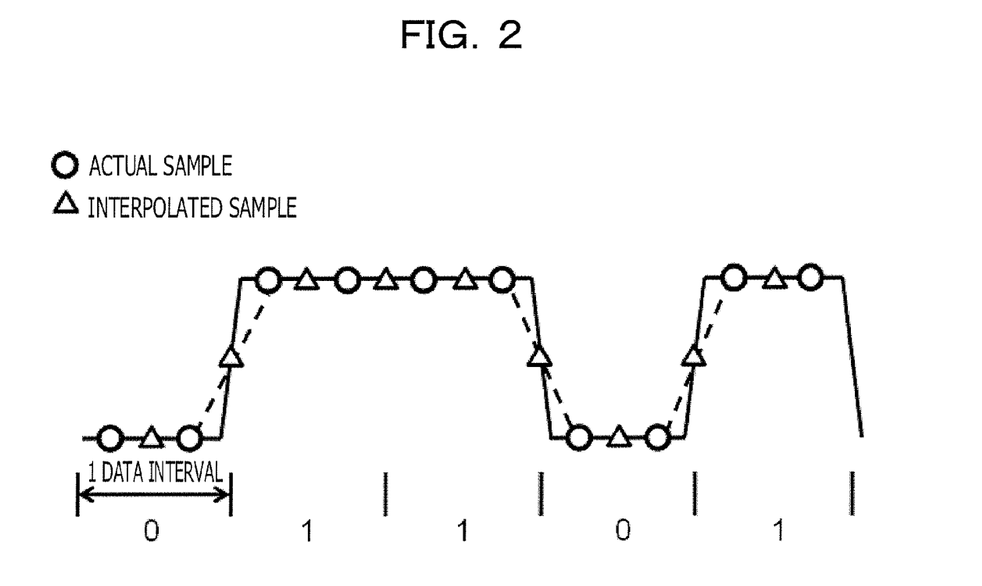
FIG. 2 illustrates an example of an interpolation data generation.

FIG. 2 illustrates an example of an interpolation data generation. FIG. 2 illustrates a process in which interpolation data are generated using a linear interpolation method in the case where the CDR circuit of FIG. 1 performs 2× oversampling in which sampling is performed at Samp.CLK which is twice the data rate.

In the sampling and data interpolation method illustrated in FIG. 2, the phase detector (PD) of the CDR method may utilize information at the middle of data and transition points of the data. As illustrated in FIG. 2, the data vary in the unit of unit interval (1 UI). In FIG. 2, the solid line indicates variations in data, circular symbols indicate sample values obtained asynchronously, the dotted line indicates an interpolation line obtained by performing a linear interpolation between two adjacent sample values, and triangular symbols indicate interpolation values obtained by performing a linear interpolation between two adjacent sample values. The interpolation data may be provided at any point on the dotted line by setting the interpolation coefficient in accordance with the phase difference between Samp.CLK and Data in. Therefore, the interpolation coefficient may be set such that the interpolation data indicated by the triangular symbols are positioned right in the middle of unit intervals. In FIG. 2, for example, the interpolation coefficient may be set to 0.5 so that the mean values of two adjacent sample values are interpolation values, for example.

In the blind-sampling CDR circuit illustrated in FIG. 1, the sample clock Samp.CLK may be set to the baud rate. For example, one sampling may be performed for unit interval.

Figure 3A:
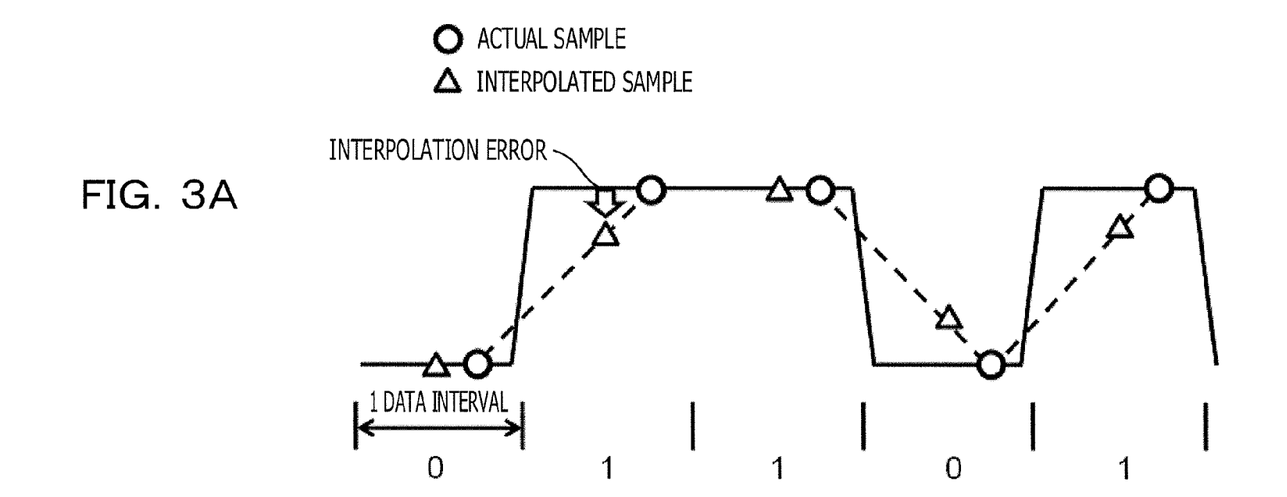
FIGS. 3A and 3B each illustrate an example of an interpolation data generation.
Figure 3B:
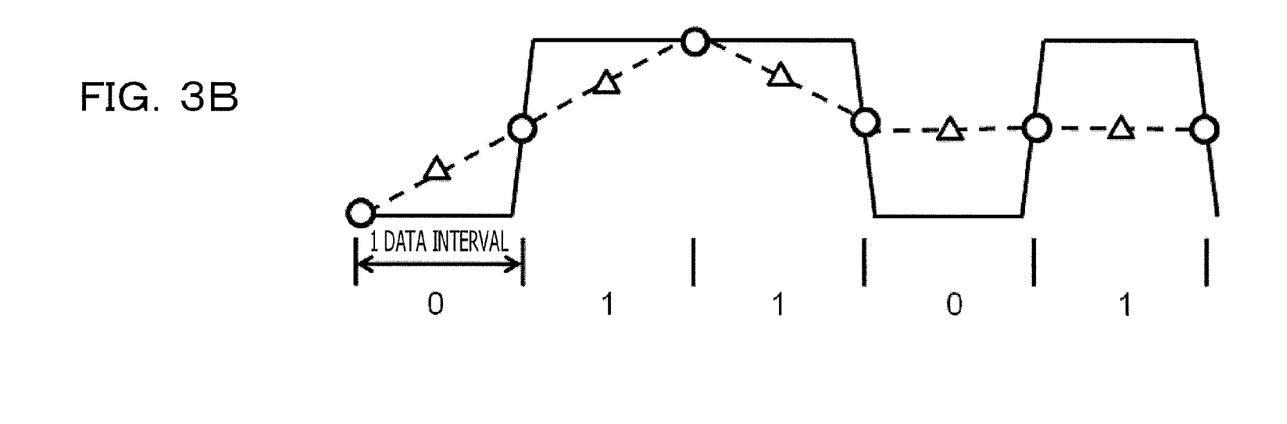

FIGS. 3A and 3B each illustrate an example of an interpolation data generation. FIGS. 3A and 3B illustrate a process in which interpolation data are generated using a linear interpolation method in the case where the CDR circuit of FIG. 1 performs sampling at Samp.CLK which is substantially equal to the baud rate. FIG. 3A illustrates a case with a certain phase difference. FIG. 3B illustrates a case with a phase difference that causes a large interpolation error.

In the case where an interpolation error that is large compared to that in FIG. 2 is caused as illustrated in FIG. 3A, data may not be reproduced but be lost as illustrated in FIG. 3B.

Figure 4:
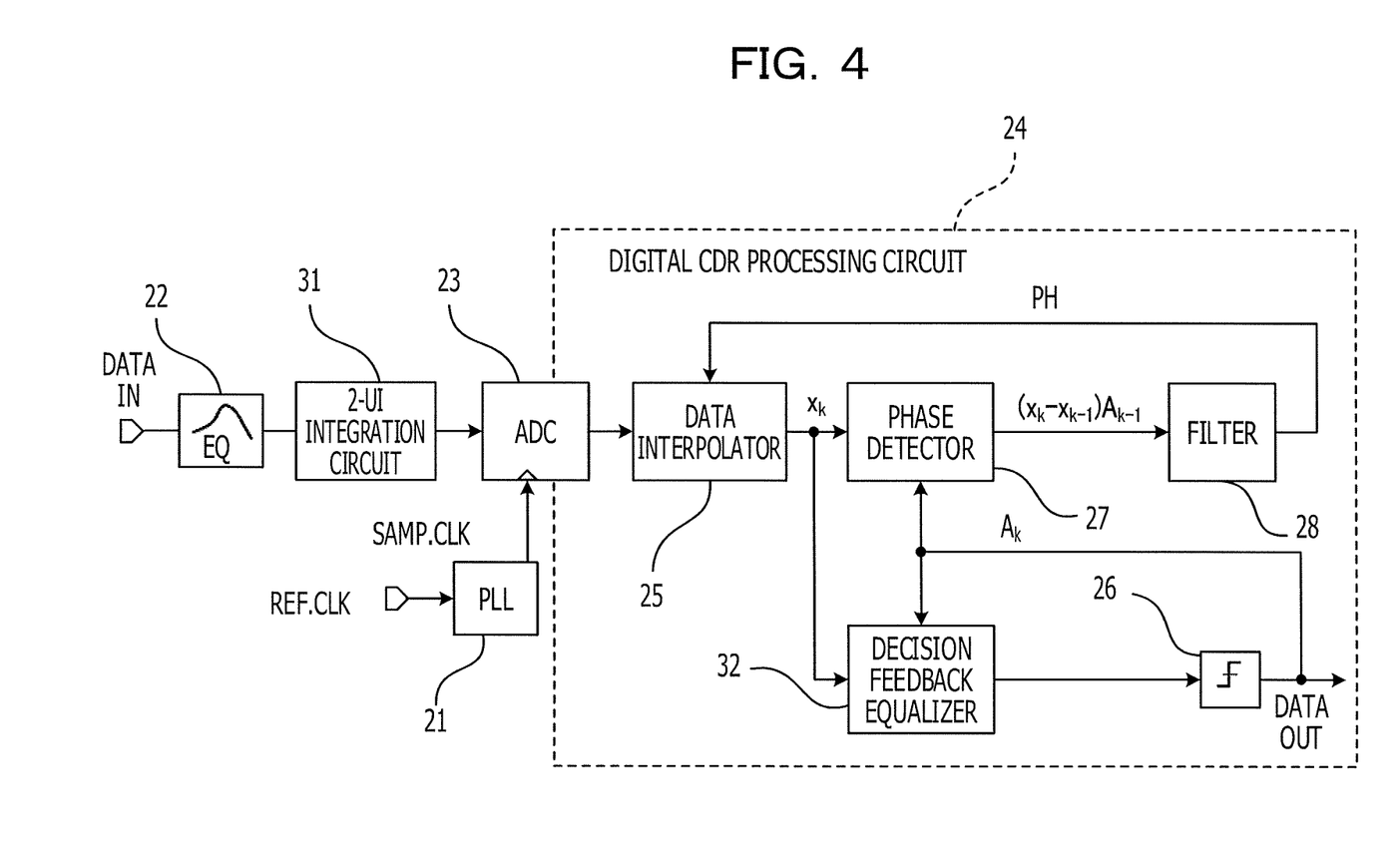
FIG. 4 illustrates an example of a blind-sampling CDR circuit.

FIG. 4 illustrates an example of a blind-sampling CDR circuit. The CDR circuit illustrated in FIG. 4 performs baud-rate sampling.

The CDR circuit includes a PLL circuit 21, an equalizer (EQ) 22, a 2-UI integration circuit 31, an analog/digital converter (ADC) 23, and a digital CDR processing circuit 24. The digital CDR processing circuit 24 includes a data interpolator (DI) 25, a phase detector 27, a filter 28, a decision feedback equalizer (DFE) 32, and a decision circuit 26.

The PLL circuit 21 multiplies the frequency of a low-speed clock Ref.clk provided from a quartz oscillator to the data rate of an input data signal Data in to generate a sample clock Samp.CLK. The sample clock Samp.CLK and the input data signal Data in may be asynchronous to each other. The EQ 22 performs an analog equalization process for correcting the effect of the symbol value of the input data signal Data in in the preceding cycle. The 2-UI integration circuit 31 generates a signal obtained by integrating the output of the EQ 22 over two cycles of the sample clock Samp.CLK, e.g. over a period of 2 UIs. The ADC 23 converts the output of the 2-UI integration circuit 31 into digital data for a certain number of bits.

The digital CDR processing circuit 24 performs a data interpolation process on a plurality of sampled digital values output from the ADC 23 so as to create a value corresponding to the middle of 1 UI, and performs a 1/0 decision on the interpolation data to generate output data Data out for one bit.

The data interpolator 25 performs a process for interpolating data output from the ADC 23 using an interpolation coefficient for creating a value corresponding to the middle of 1 UI based on a certain interpolation method. The phase detector 27 generates phase difference data $(x_k - x_{k-1})A_{k-1}$ indicating the phase of the output $x_k$ of the data interpolator 25 with respect to the sample clock Samp.CLK based on the output $x_k$ of the data interpolator 25 and the results $A_k$ of a decision performed by the decision circuit 26. The filter 28 performs a filtering process on the phase difference data $(x_k - x_{k-1})A_{k-1}$ output from the phase detector 27 to generate phase information ph.

The data interpolator 25 decides an interpolation coefficient for creating a value corresponding to the middle of 1 UI based on the phase information ph output from the filter 28, and performs an interpolation process.

The decision feedback equalizer 32 performs an equalization process on the output $x_k$ of the data interpolator 25 based on the results $A_k$ of the decision performed by the decision circuit 26. The decision circuit 26 performs a 1/0 decision in which the data which have been subjected to the interpolation process and the decision feedback equalization process output from the decision feedback equalizer 32 is compared with a threshold level, and generates the decision results $A_k$. The decision results $A_k$ may be the output data Data out. The CDR circuit illustrated in FIG. 4 may be similar in configuration to the CDR circuit illustrated in FIG. 1, and may include the 2-UI integration circuit 31 and the decision feedback equalizer 32.

Figure 5A:
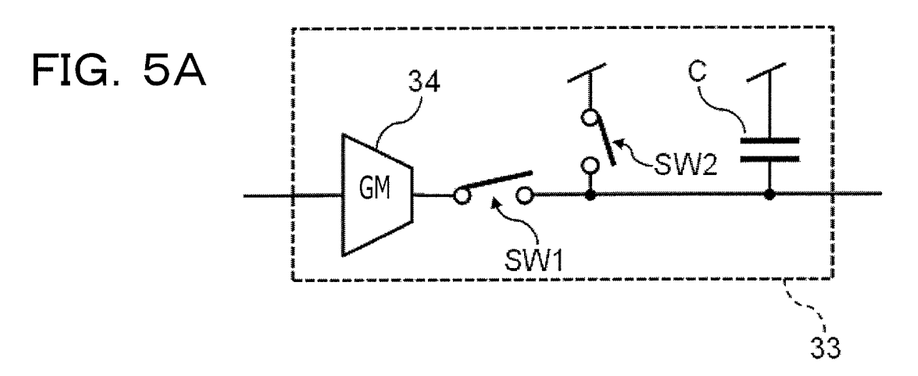
FIG. 5A illustrates an example of an integration circuit.
Figure 5B:
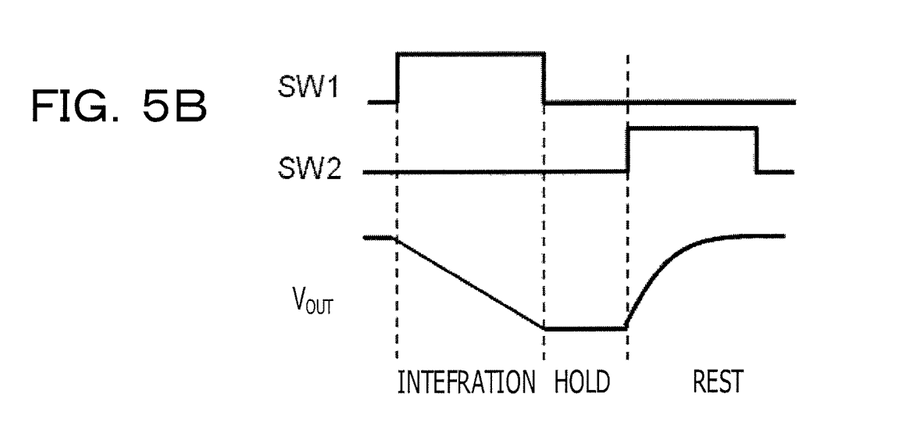
FIG. 5B illustrates an example of operation of an integration circuit.

FIG. 5A illustrates an example of an integration circuit. FIG. 5B illustrates an example of an operation of an integration circuit. An integration circuit 33 may be used for the 2-UI integration circuit 31 illustrated in FIG. 4. The integration circuit 33 includes an amplifier 34, two switches SW1 and SW2, and a capacitor C. Turning on (closing) the SW2 resets the capacitor C to its initial value. Turning on the SW1 after the SW2 is turned off (opened) causes the capacitor C to be charged (or discharged) by the output of the amplifier 34 which has amplified an input signal, thereby integrating the input signal. When the SW1 is turned off, the integration is ended, and the integrated value is held and output. The period for which the SW1 is turned on may be an integration period. The period for which the SW1 and the SW2 are turned off may be an output period. The period for which the SW2 is turned on may be a reset period.

Figure 6A:
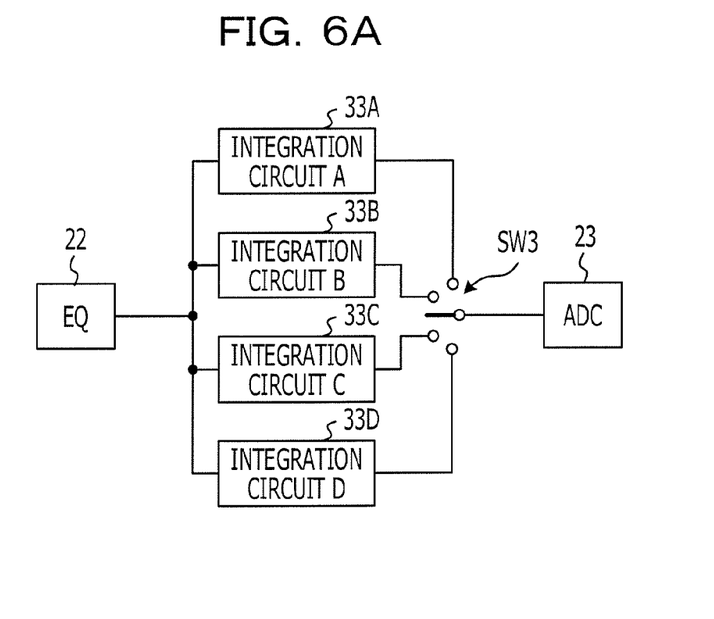
FIG. 6A illustrates an example of an integration circuit.
Figure 6B:
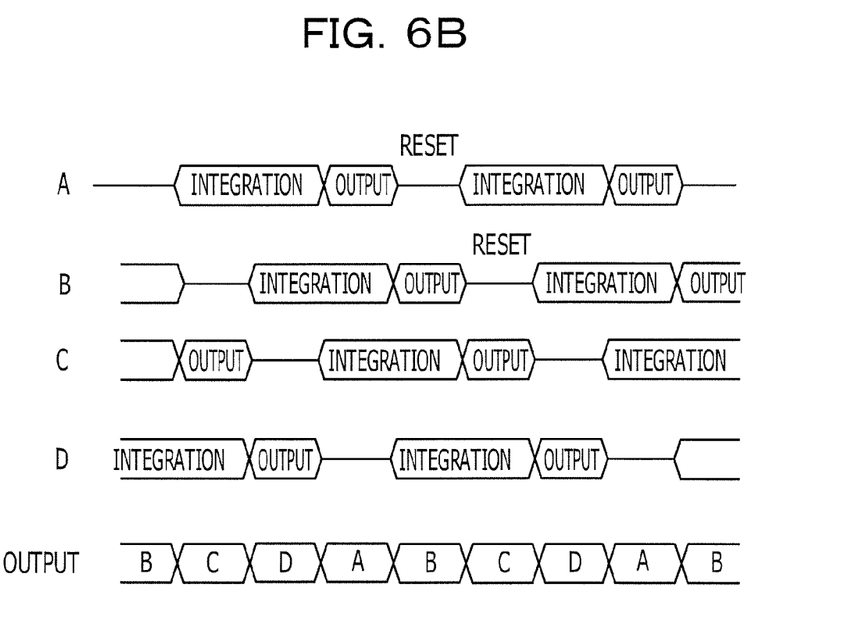
FIG. 6B illustrates an example of operation of an integration circuit.

FIG. 6A illustrates an example of an integration circuit. FIG. 6B illustrates an example of operation of an integration circuit. The integration circuit in FIGS. 6A and 6B may be the 2-UI integration circuit 31 illustrated in FIG. 4.

The 2-UI integration circuit 31 includes four integration circuits 33A to 33D and a switch SW3. The integration circuits 33A to 33D may be the integration circuit illustrated in FIG. 5A, or may be other integration circuits. The integration circuits 33A to 33D each repeat a cycle including an integration period for 2 UIs, an output period for 1 UI, and a reset period for 1 UI. The integration circuits 33A to 33D operate in cycles shifted by 1 UI from each other.

When the integration circuit 33A is in the first UI period of the integration period, the integration circuit 33B is in the reset period, the integration circuit 33C is in the output period, and the integration circuit 33D is in the second UI period of the integration period. In the next UI period, the integration circuit 33A is in the second UI period of the integration period, the integration circuit 33B is in the first UI period of the integration period, the integration circuit 33C is in the reset period, and the integration circuit 33D is in the output period. In the further next UI period, the integration circuit 33A is in the output period in which a value integrated over 2 UIs is output, the integration circuit 33B is in the second UI period of the integration period, the integration circuit 33C is in the first UI period of the integration period, and the integration circuit 33D is in the reset period.

By repeating the operation described above, the integration circuits 33A to 33D perform 2-UI integration while shifting by 1 UI from each other. The 2-UI integration in which integration is performed over an interval that is twice unit interval may be performed at the front end portions, for example.

Figure 7A:
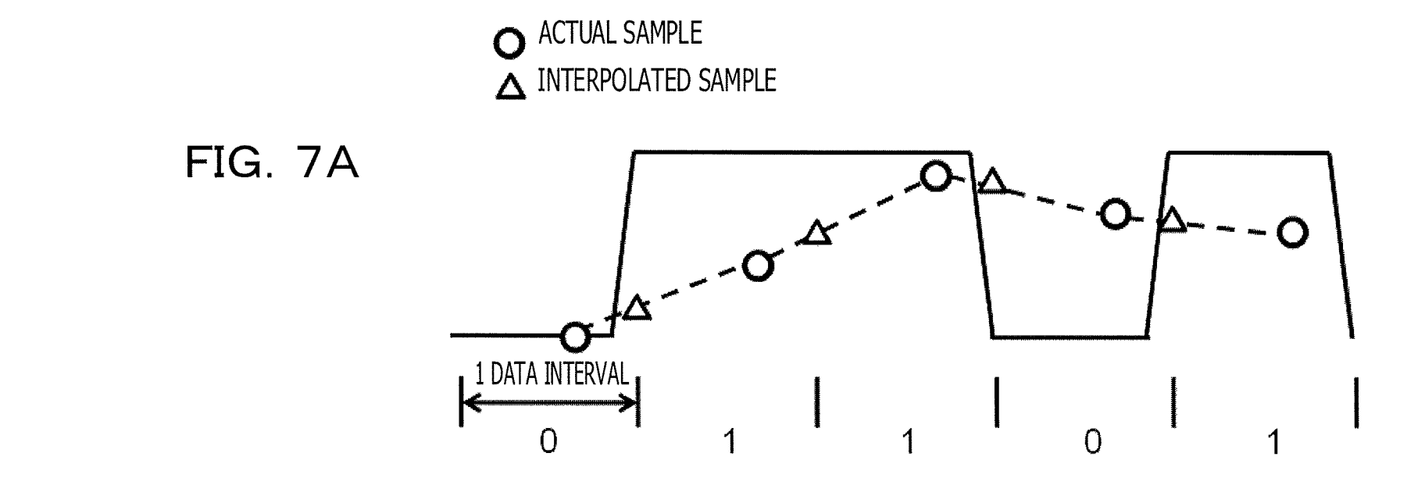
FIGS. 7A and 7B each illustrate an example of an interpolation data generation.
Figure 7B:
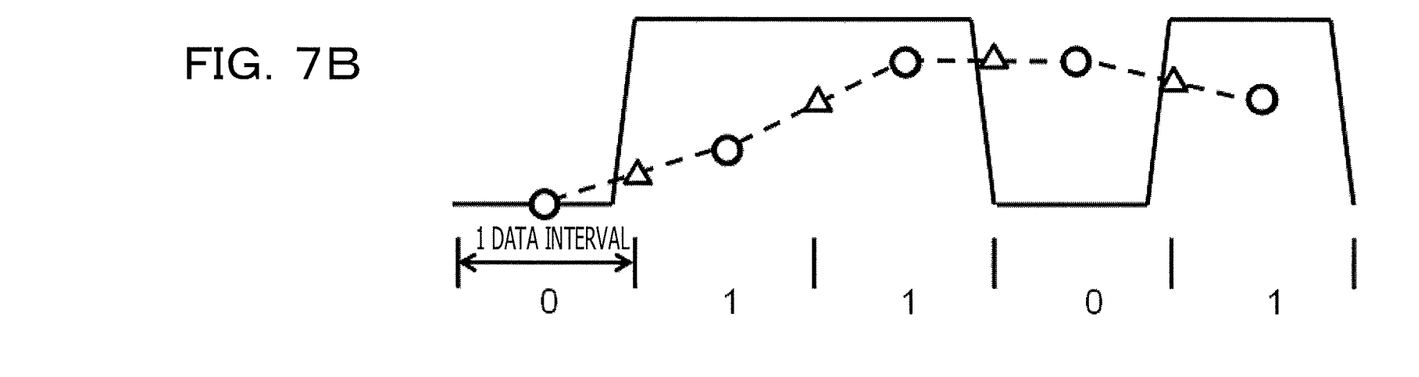

FIGS. 7A and 7B each illustrate an example of an interpolation data generation. In FIGS. 7A and 7B, a signal obtained through 2-UI integration is sampled at Samp.CLK which is substantially equal to the baud rate, and subjected to a linear interpolation method to generate interpolation data. The interpolation coefficient for FIG. 7A and the interpolation coefficient for FIG. 7B are different from each other.

In FIGS. 7A and 7B, the solid line indicates the input data signal Data in before being integrated. In FIGS. 7A and 7B, circular symbols indicate sample values sampled asynchronously by the ADC 23, the dotted line indicates an interpolation line obtained by performing a linear interpolation between two adjacent sample values, and triangular symbols indicate interpolation values obtained by performing a linear interpolation between two adjacent sample values.

Through 2-UI integration, high-frequency components at the sampling rate or higher are reduced. This may reduce the interpolation error, and may improve the reproducibility in tracing variations in original data even during sampling at the baud rate. Such an improvement is seen in FIGS. 7A and 7B with different interpolation coefficients.

Figure 8:
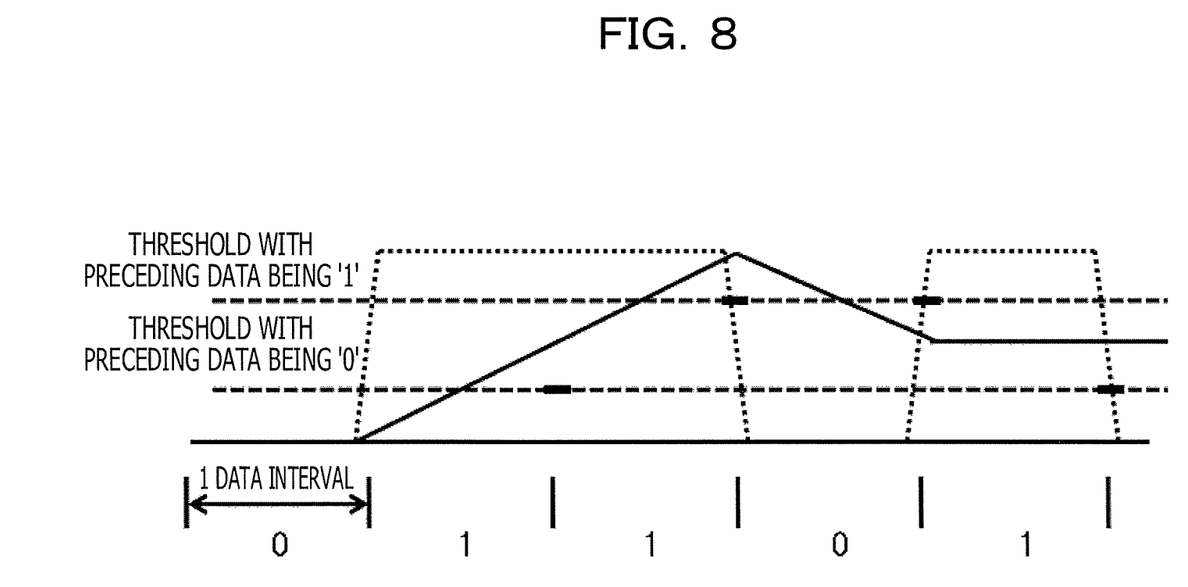
FIG. 8 illustrates an example of data reproduction.

FIG. 8 illustrates an example of a data reproduction. In FIG. 8, received data are reproduced from a waveform after 2-UI integration. As illustrated in FIG. 8, the threshold for a 1/0 decision is changed using data 1 UI earlier. The decision feedback equalizer 32 may perform an equalization process in accordance with the results of a decision performed by the decision circuit 26 to change the threshold. For example, the equalization process may be performed so as to decrease the interpolation data $x_k$ when the data 1 UI earlier indicate "1", and so as to increase the interpolation data $x_k$ when the data 1 UI earlier indicate "0".

The PLL circuit 21, the EQ 22, the ADC 23, the data interpolator 25, the phase detector 27, the filter 28, and the decision circuit 26 may be substantially the same as or similar to the corresponding elements illustrated in FIG. 1.

Linear interpolation is performed in the data interpolator 25 and the phase detector 27. In order to reduce the interpolation error, O. Tyshchenko, et al. "A 5 Gb/s ADC-Based Feed-Forward CDR in 65 nm CMOS," O. Tyshchenko, et al. "A Fractional-Sampling-Rate ADC-Based CDR with Feed-Forward Architecture in 65 nm CMOS," Mueller, K. et al. "Timing Recovery in Digital Synchronous Data Receivers," Spagna, F. et al. "A 78 mW 11.8 Gb/s serial link transceiver with adaptive RX equalization and baud-rate CDR in 32 nm," and so forth describe high-precision interpolation and phase difference detection methods such as high-order (second- or higher-order) interpolation and phase detection in which a Mueller-Muller phase detector (MMPD) is used. Such interpolation methods may be used. In the CDR circuit illustrated in FIG. 4, an ADC is provided at its front end, and the subsequent processes are executed through digital processing. Therefore, complicated computation that is difficult for an analog circuit may be performed well.

In the data interpolator 25, the interpolation error may be reduced by utilizing a Mueller-Muller phase detector or using extrapolation such as second- or higher-order interpolation for making a decision performed by the decision feedback equalizer 32 reliable.

FIGS. 9A to 9D each illustrate an example of a quadratic interpolation. The quadratic interpolation illustrated in FIGS. 9A to 9D may be performed by the data interpolation circuit 25 illustrated in FIG. 4. When high-order interpolation is used, the circuit scale of a digital circuit such as a multiplier and the calculation time are increased, and therefore a simplified approximation formula may be used. FIGS. 9A to 9D illustrate an example of such interpolation.

Figure 9A:
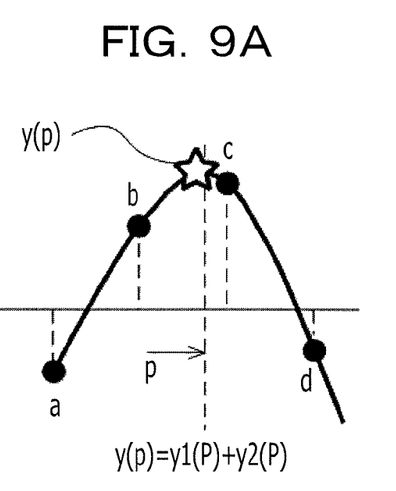
FIGS. 9A to 9D each illustrate an example of a quadratic interpolation.

In FIG. 9A, sequential asynchronous samples $x_{k-1}$, $x_k$, $x_{k+1}$, and $x_{k+2}$ are indicated by a, b, c, and d, respectively. y(p) is interpolation data generated between b and c, and has an interpolation coefficient p.

Figure 9B:
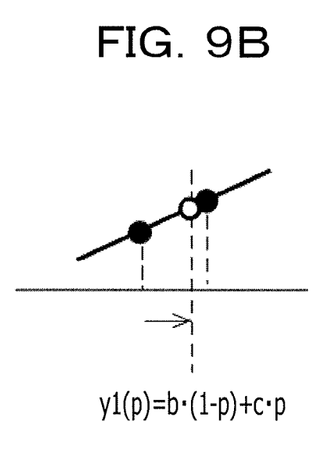
Figure 9C:
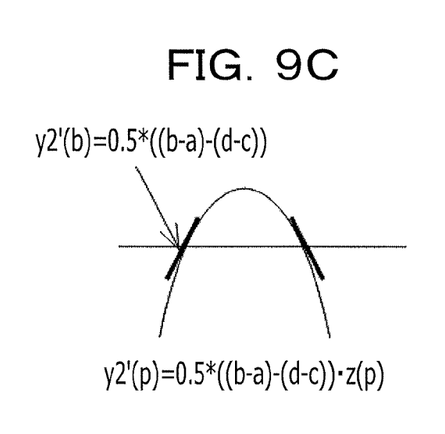
Figure 9D:
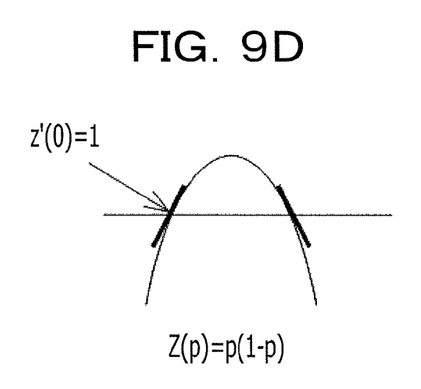

The interpolation data y(p) is approximated by y(p)=y1(p)+y2(p). y1(p) is a linear interpolation term, and is defined as y1(p)=b(1−p)+cP as illustrated in FIG. 9B. y2(p) is a quadratic interpolation term, and is defined as y2(p)=0.5((b−a)−(d−c))*z(p) as illustrated in FIG. 9C. z(p) is defined as $z(p)=p(1-p)$, and is a quadratic function that passes through the origin as illustrated in FIG. 9D. y2(p) is obtained by averaging the respective slopes of lines coupling two sets of points a, b and c, d provided across y(p), and scaling z(p) using the resulting average.

As the baud-rate phase detection method used by the phase detector 27, the Mueller-Muller phase detection method described in O. Tyshchenko, et al. "A 5 Gb/s ADC-Based Feed-Forward CDR in 65 nm CMOS," O. Tyshchenko, et al. "A Fractional-Sampling-Rate ADC-Based CDR with Feed-Forward Architecture in 65 nm CMOS," or Mueller, K. et al. "Timing Recovery in Digital Synchronous Data Receivers" may be adopted.

Figure 10:
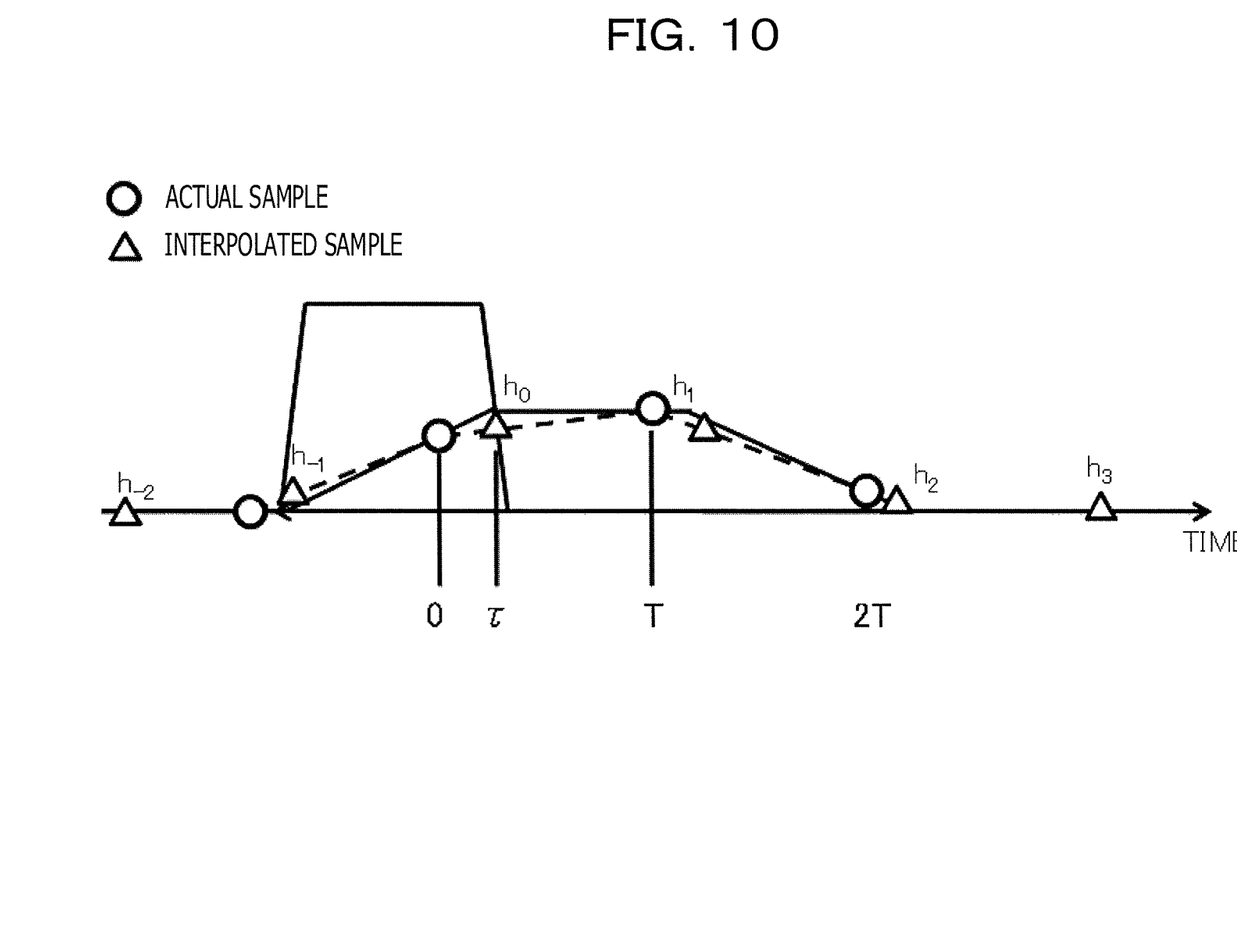
FIG. 10 illustrates an example of a unit pulse.

FIG. 10 illustrates an example of a unit pulse. In FIG. 10, a unit pulse ( . . . 00100 . . . ) is subjected to 2-UI integration. In FIG. 10, circular symbols indicate sample values sampled asynchronously at sampling intervals T, triangular symbols indicate interpolation data values $h_i$ generated through interpolation, and the time of the interpolation data is indicated by $kT+\tau$. $\tau$ indicates the time difference between the ideal sample timing and the current asynchronous sample. As illustrated in FIG. 10, the response waveform of the unit pulse subjected to 2-UI integration is trapezoidal in an ideal case, and therefore the interpolation coefficient ph is determined such that $h_0=h_1$ is established. For example, $h_n$ is indicated as $E[x_{k+n} \cdot A_k]$ (where $E[x_k]$ is an expected value of $x_k$). Since the circular symbols indicate asynchronously sampled values, the circular symbols move along with time. Controlling the interpolation coefficient ph such that $h_0=h_1$ is established along with the movement may enable a decision to be performed at the correct timing $\tau$. For example, when $h_0-h_1<0$ is established, the interpolation coefficient ph may be too small, and the sample timing of the interpolation samples may be earlier than $\tau$, and the interpolation coefficient ph may be increased. When $h_0-h_1>0$ is established, the opposite process may be performed.

Figure 11A:
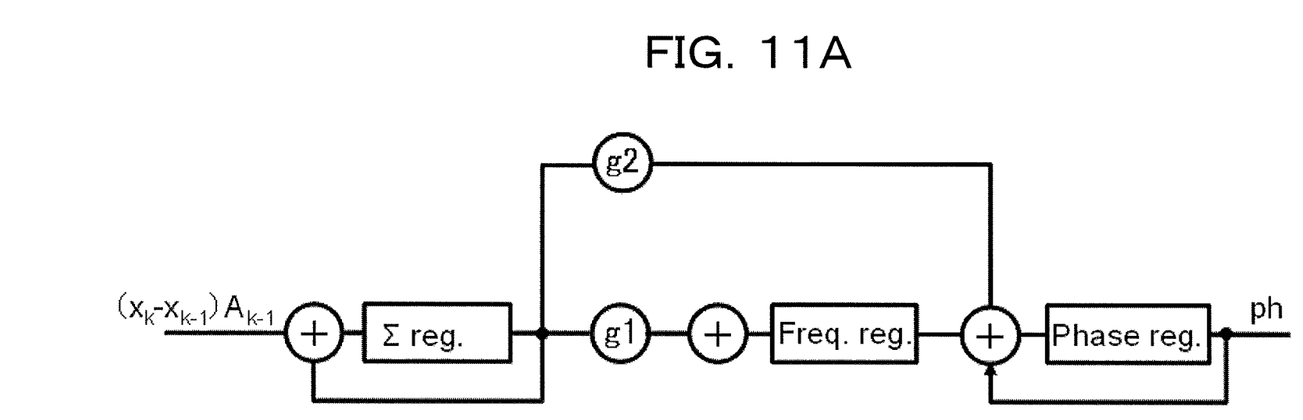
FIGS. 11A and 11B illustrate an example of a filter.
Figure 11B:
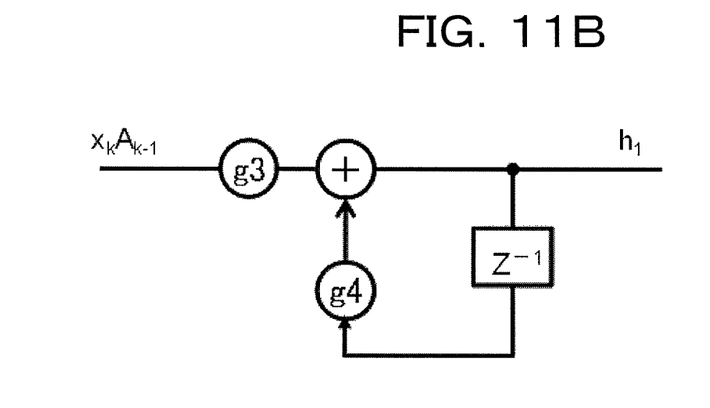

FIGS. 11A and 11B illustrate an example of a filter. The filter 28 illustrated in FIGS. 11A and 11B may have the function of a low-pass filter. The filter 28 may be a digital filter. The filter 28 illustrated in FIG. 14 may be the filter illustrated in FIGS. 11A and 11B, and may be the filter described in O. Tyshchenko, et al. "A 5 Gb/s ADC-Based Feed-Forward CDR in 65 nm CMOS" etc., for example.

Figure 12:
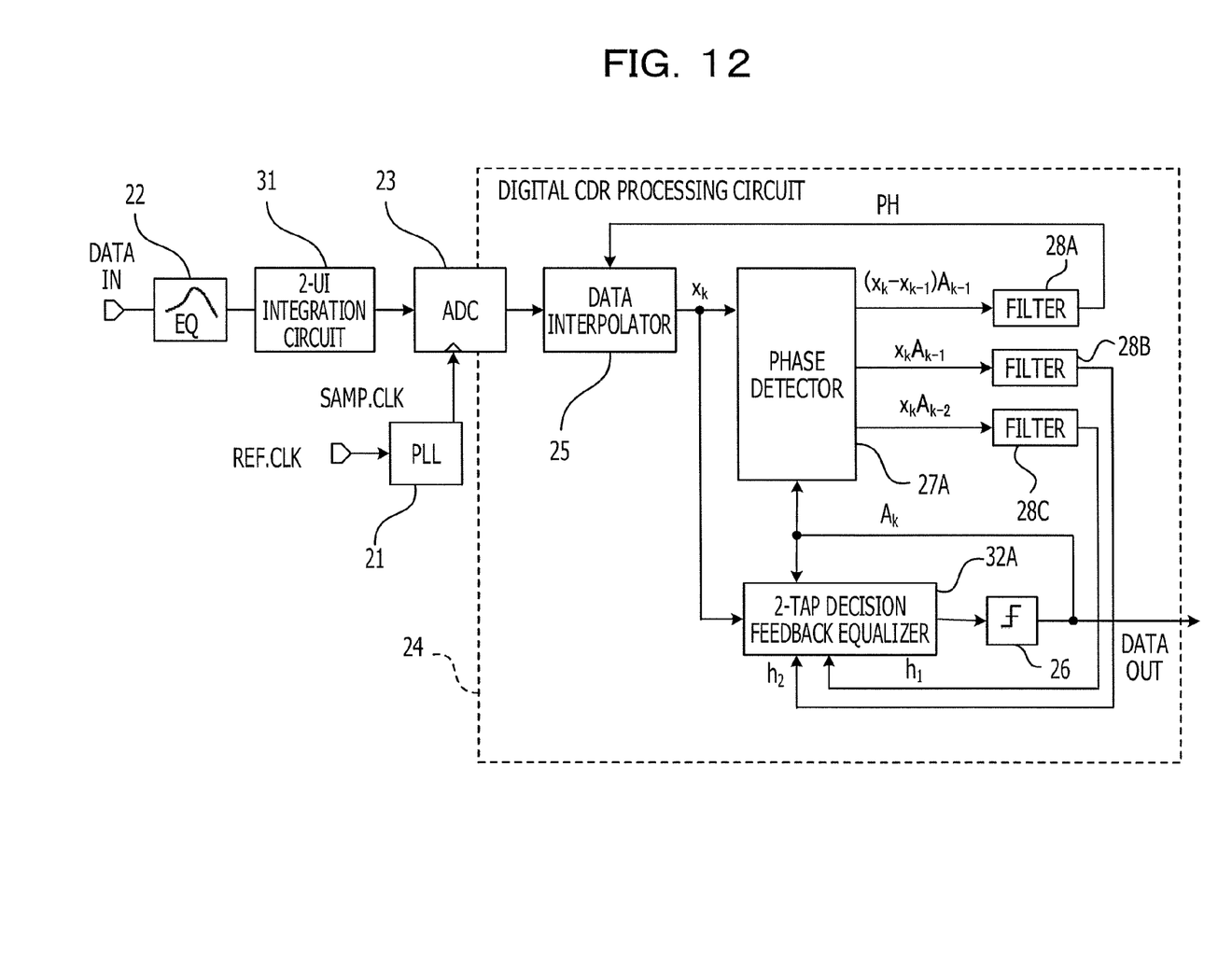
FIG. 12 illustrates an example of a sampling CDR circuit.

FIG. 12 illustrates an example of a sampling CDR circuit. The sampling CDR circuit illustrated in FIG. 12 may perform baud-rate sampling.

The CDR circuit illustrated in FIG. 12 may use $h_n$, which is calculated by a phase detector 27A using a Mueller-Muller phase detector (MMPD), for example, as the coefficient for a decision equalizer 32A. Therefore, the CDR circuit illustrated in FIG. 12 is different from the CDR circuit illustrated in FIG. 4 in the phase detector 27A and the 2-tap decision equalizer 32A, and may be provided with three filters 28A to 28C. Other components illustrated in FIG. 12 may be substantially the same as or similar to the components illustrated in FIG. 4.

In the decision feedback equalization process, in order to cancel intersymbol interference, $h_n$ calculated by the MMPD of the phase detector 27A may be used as the coefficient for the 2-tap decision equalizer. In FIG. 12, the number of taps of the 2-tap decision equalizer 32A may be set to two so that 2-UI integration may be performed using $h_1$ to cancel a residual one tap earlier and intersymbol interference due to an insufficient channel band may be reduced using $h_2$. $h_1$ and $h_2$ may be calculated as $E[x_k A_{k-1}]$ and $E[x_k A_{k-2}]$, respectively. These are calculated in the same manner as the calculation used by the MMPD to detect a phase, and therefore may be performed by common hardware.

The phase detector 27A outputs phase difference data $(x_k-x_{k-1})A_{k-1}$ to the filter 28A. The filter 28A generates phase information ph from the phase difference data $(x_k-x_{k-1})A_{k-1}$, and outputs the phase information ph to the data interpolator 25. The phase detector 27A outputs phase difference data $x_k A_{k-1}$ corresponding to $h_2$ to the filter 28B, and outputs phase difference data $X_k A_{k-2}$ corresponding to $h_1$ to the filter 28C. The filters 28B and 28C may perform a filtering process that is substantially the same as, similar to, or different from that performed by the filter 28A, and output the process results $h_1$ and $h_2$ to the 2-tap decision equalizer 32A. The 2-tap decision equalizer 32A may perform the equalization process described above using the decision results $A_k$ in addition to $h_1$ and $h_2$.

Figure 13:
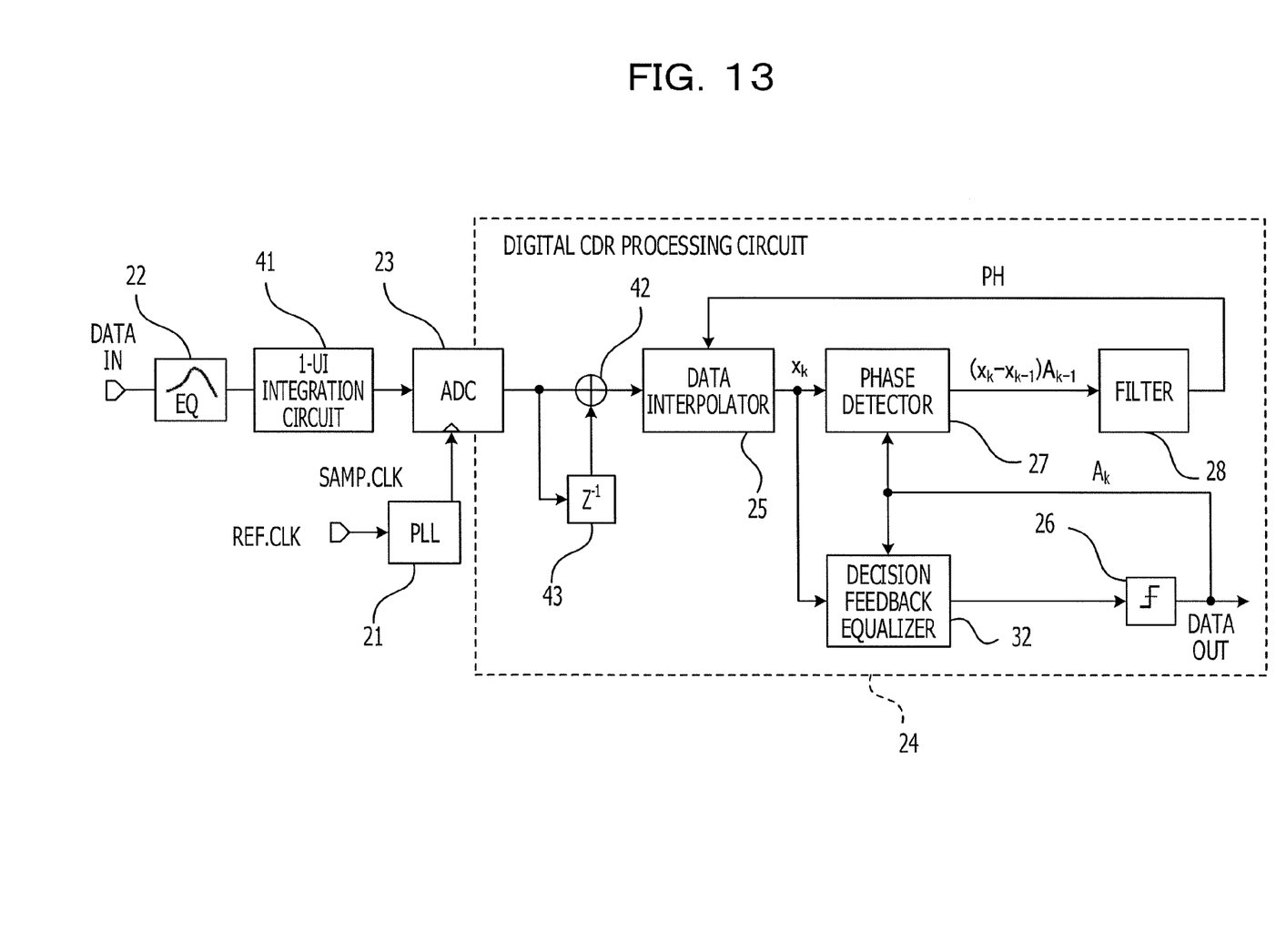
FIG. 13 illustrates an example of a sampling CDR circuit.

FIG. 13 illustrates an example of a sampling CDR circuit. The sampling CDR circuit illustrated in FIG. 13 may perform baud-rate sampling. The CDR circuit illustrated in FIG. 13 includes a 1-UI integration circuit 41 in place of the 2-UI integration circuit 31. A 1-UI integration circuit including a delay circuit $(Z^{-1})$ 43 that delays by 1 UI and an addition circuit 42 is provided after the ADC 23. The other components illustrated in FIG. 13 are the same as those in FIG. 1.

As illustrated in FIG. 4, the 2-UI integration circuit 31 in the analog processing portion may perform 2-UI integration. As illustrated in FIG. 13, 1-UI integration may be performed in the analog processing portion, and may be extended to 2-UI integration in the digital processing section. When integration is performed in the analog processing portion, the integration time may be varied because of clock jitter or the like, and correct integration results may not be obtained. Therefore, in the 2-UI integration circuit 31 illustrated in FIG. 4, the integration pulse width may be increased to reduce a constraint on the clock. When an ADC with the same resolution is used, the resolution of the finally obtained digital signal $x_k$ may be higher with the CDR circuit illustrated in FIG. 13. When a process at the same resolution is performed, the number of bits the ADC 23 of the CDR circuit illustrated in FIG. 13 may be smaller by one bit than the number of bits of the ADC 23 of the CDR circuit illustrated in FIG. 4.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A clock data recovery method comprising:
   integrating an input data signal over a number of cycles of a sample clock to generate an integrated signal;
   performing a digital process on the integrated signal to output a first digital signal;
   interpolating, in a data interpolator, the first digital signal in accordance with phase information to generate interpolation data;
   receiving, in a phase detector, the interpolation data from the data interpolator and outputting phase difference data indicating a difference in phase of the interpolation data from the sample clock;

performing a filtering process on the phase difference data to generate the phase information;

receiving the interpolation data, which is output from the data interpolator and is the same as the interpolation data that is received in the phase detector, and performing an equalization process on the interpolation data in accordance with output data; and performing a binary decision on results of the equalization process to generate the output data.

2. The clock data recovery method according to claim 1, wherein the number of cycles is two.

3. The clock data recovery method according to claim 1, wherein the digital process includes converting the integrated signal into the first digital signal in accordance with the sample clock.

4. The clock data recovery method according to claim 1, wherein the digital process includes:
converting the integrated signal into a second digital signal in accordance with the sample clock; and
adding the second digital signal to a delayed second digital signal which is obtained by delaying the second digital to output a digital signal as the first digital signal.

5. A clock data recovery circuit comprising:
an integration circuit configured to integrate an input data signal over a number of cycles of a sample clock;
a digital processing circuit configured to perform a digital process on a signal output from the integration circuit in accordance with the sample clock to output a digital signal;
a data interpolator configured to interpolate the digital signal in accordance with phase information to generate interpolation data;
a phase detector configured to receive the interpolation data form the data interpolator and output phase difference data indicating a difference in phase of the interpolation data from the sample clock;
a filter configured to perform a filtering process on output of the phase detector to generate the phase information;
a decision feedback equalizer configured to receive the interpolation data, which is output from the data interpolator and is the same as the interpolation data that is received in the phase detector, and perform an equalization process on the interpolation data in accordance with output data; and
a decision circuit configured to perform a binary decision on output of the decision feedback equalizer to generate the output data.

6. The clock data recovery circuit according to claim 5, wherein the number of cycles is two, and the digital processing circuit includes an analog/digital converter that converts the signal output from the integration circuit into the digital signal.

7. The clock data recovery circuit according to claim 6, wherein the phase detector integrates a value obtained by multiplying the output data by a value output from the analog/digital converter which is sampled at a different timing from a sample timing of the output data to acquire a unit pulse response, and detects a phase from a shape of the unit pulse response.

8. The clock data recovery circuit according to claim 7, wherein the decision feedback equalizer uses the unit pulse response calculated by the phase detector as an equalization coefficient.

9. The clock data recovery circuit according to claim 5, wherein the digital processing circuit includes:
an analog/digital converter configured to process the signal output from the integration circuit; and
an addition circuit configured to add an output of the analog/digital converter to a delayed output of the analog/digital converter which is obtained by delaying the output of the analog/digital converter to output the digital signal.

10. The clock data recovery circuit according to claim 5, further comprising:
a clock generation circuit configured to generate the sample clock,
wherein the sample clock is asynchronous to the input data signal, and has a cycle that approximates one unit interval of the input data signal.

11. The clock data recovery circuit according to claim 5, wherein the decision feedback equalizer provides decision feedback with two or more taps.

* * * * *